April 4, 1944.　　　C. RINGWALD　　　2,345,630

WELDING APPARATUS

Filed Sept. 2, 1942　　　2 Sheets-Sheet 1

INVENTOR.
Clarence Ringwald
BY Staley & Welch
ATTORNEYS.

April 4, 1944.                    C. RINGWALD                    2,345,630
                              WELDING APPARATUS
                          Filed Sept. 2, 1942                2 Sheets-Sheet 2
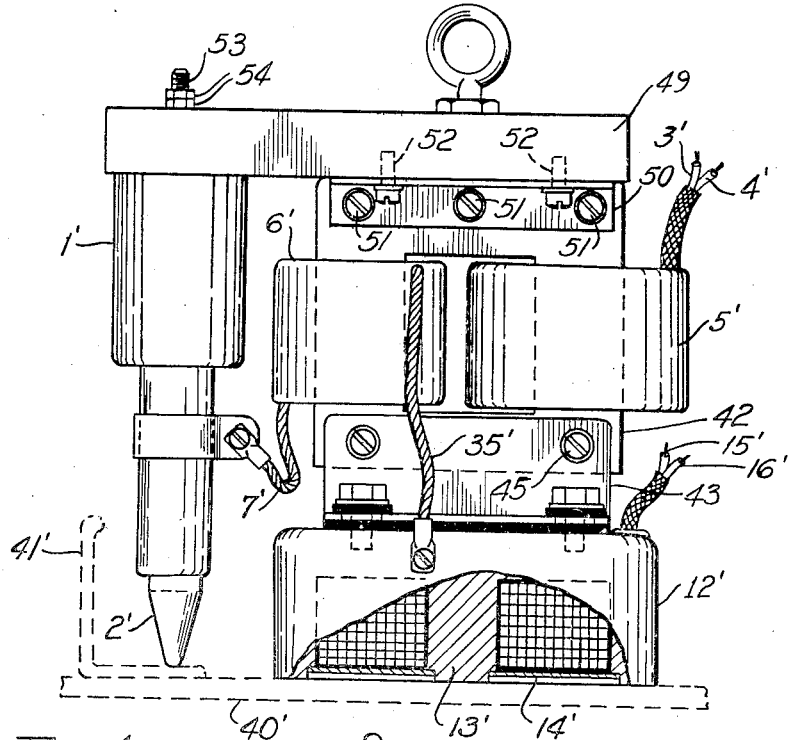
Fig. 4
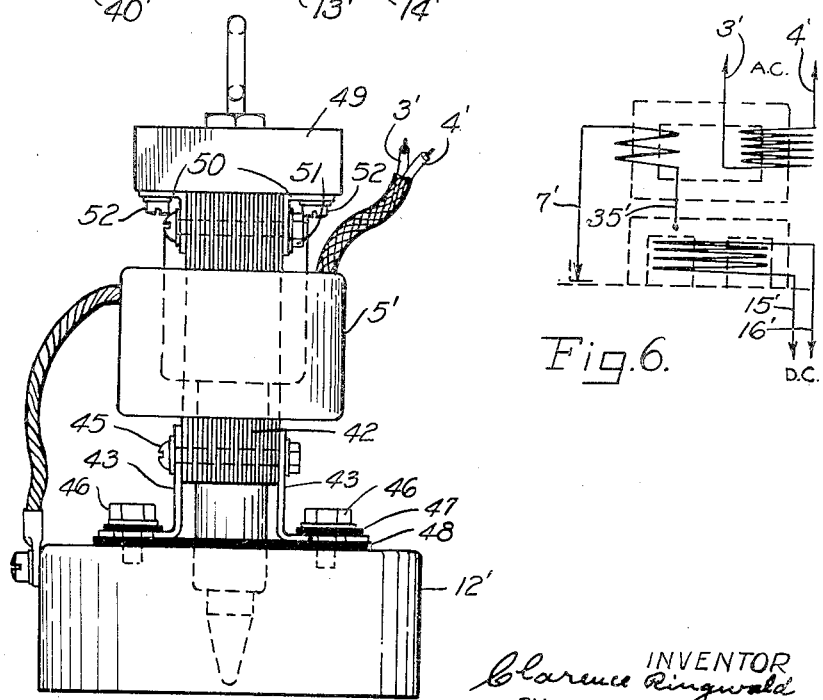
Fig. 5.                                                   Fig. 6.
INVENTOR
Clarence Ringwald
BY Staley & Welch
ATTORNEYS Patented Apr. 4, 1944

2,345,630

UNITED STATES PATENT OFFICE 2,345,630

WELDING APPARATUS

Clarence Ringwald, Springfield, Ohio

Application September 2, 1942, Serial No. 456,990

3 Claims. (Cl. 219—4)

This invention relates to portable welding machines, it more particularly relating to means for supporting parts at least of the welding machine in relation to the work.

One of the objects of the invention is to provide means for supporting parts at least of the welding machine which will permit the machine to readily and quickly move along the work to form the welding operations.

A further object of the invention is to provide a support for parts at least of a welding machine which will adapt the machine more efficiently for resistance welding by enabling the pressure on the electrode to be more effectively applied.

A further object of the invention is to provide a support for welding electrodes when the electro-magnet is not used as an electrode.

A more specific object of the invention is to provide a support comprising an electro-magnet which may be energized from any suitable source of direct current electrical supply to cause it to be attracted to either the metallic work or to a metallic support for the work.

Other objects of the invention will appear from the accompanying description, claims and drawings.

In the accompanying drawings:

Fig. 4 is a view partly in side elevation and partly in vertical section of a modification.

Fig. 5 is an end view of the same.

Fig. 6 is a circuit diagram for the apparatus shown in Figs. 4 and 5.

Figure 1:
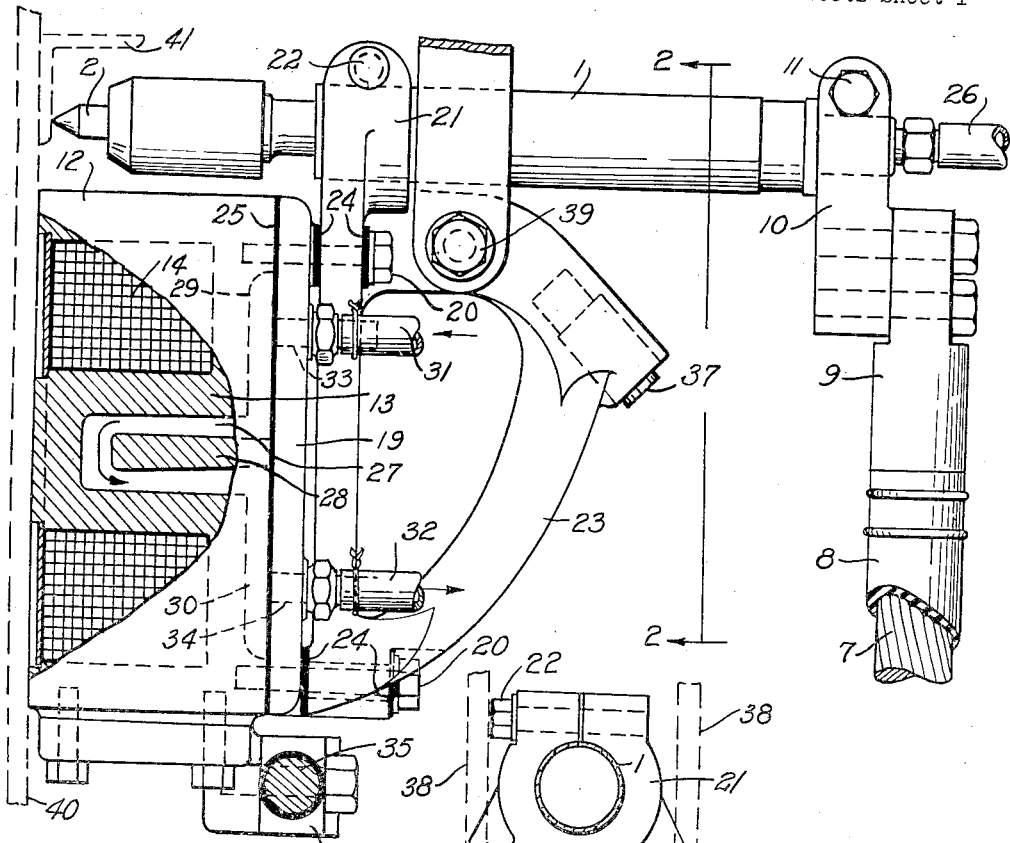
Fig. 1 is a side elevational view, partially in section, of a magnetically attached electric welding head of the suspended type such as may be used on a surface, such for instance as in the case of a ship's hull.
Figure 3:
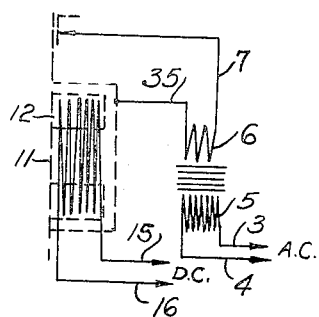
Fig. 3 is a circuit diagram thereof.
Figure 2:
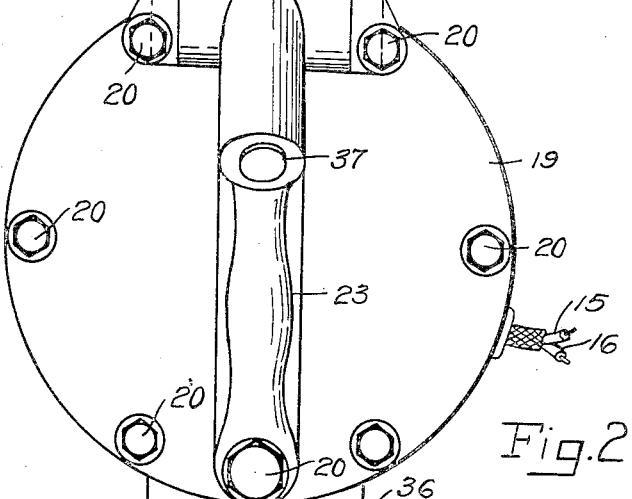
Fig. 2 is a sectional view of the same on the line 2—2 of Fig. 1.

Referring first to Figs. 1 to 3, inclusive, 1 represents the holder for the electrode 2, the electrode 2 being a part of any well known welding apparatus of the suspended type; the other parts of the welding machine such as the control box and its control mechanism, the transformer and so forth not being shown but being suspended in any suitable way. Current to the transformer is supplied from A. C. power lines shown at 3 and 4 in Fig. 3 which lead from the control box in a well known way and are connected to the ends of a primary 5 of a step-down transformer, one end of the secondary 6 of which is connected to the electrode 2 by copper cable 7 encased in a tube 8 of insulating material which is preferably hollow to provide for water cooling. The cable 7 is connected to a terminal lug 9 which is bolted to a split terminal 10 which is clamped to the holder 1 by the bolts 11.

The holder 1 and electrode 2 are supported by an electro-magnet, the body of which is indicated at 12, the core at 13 and the coil at 14. Current is supplied to the coil from D. C. power lines 15 and 16, these lines 15 and 16 leading to a suitable timing device in the control box heretofore referred to, which is not shown as it is well known in the art. Bolted to the body 12 of the electro-magnet is a circular head 19, the body of the magnet being preferably cylindrical in form, the bolts which secure the head to the body of the magnet being indicated at 20. Two of the bolts 20 secure to the head 19 a split bracket 21 which is clamped to the holder 1 by the bolt 22. A handle 23 is formed integrally with the bracket and its lower end is attached to the head by one of the bolts 20. The bolts which secure the bracket and handle are insulated from the head by the insulating washers 24; the head 19 being also insulated from the body of the magnet by insulating material 25.

Fluid pressure means are carried by the holder 1 for applying pressure to the electrode 2, such means not being shown as they are of a well known character, air under pressure being preferably supplied thereto through the flexible pipe 26.

The core 13 of the electro-magnet is preferably water-cooled and for that purpose is formed with a chamber 27 having a division wall 28. The chamber 27 communicates with passages 29 and 30 formed in the body of the magnet and water is supplied to and exhausted from the chamber 27 by the water lines 31 and 32 which pass through apertures 33 and 34 in the head 19 which apertures communicate with the passages 29 and 30.

In the present case the body of the electromagnet forms one of the electrodes and one end of the secondary of the transformer is connected therewith through the copper cable 35, the cable being connected to the terminal 36.

For the purpose of applying pressure to the electrode 2 by the fluid pressure means a thumb switch 37 is carried by the upper portion of the handle which controls the fluid pressure means. For the purpose of suspending the structure described there is provided a bifurcated hanger, the members of which are indicated at 38, the lower ends of which are secured to the upper portion of the handle by the bolts 39.

In Fig. 1 the device is shown positioned against a metallic wall 40 such as the hull of a ship for the purpose of welding to the hull a metallic angle-shaped strengthening rib indicated at 41.

In operation, the magnet will first be energized by the closing of suitable switch members (not shown) so as to be attracted to the wall 40 to which the rib 41 is to be welded whereby the electrode 2 which is positioned at the side of and closely adjacent to the magnet is held in that position for a welding operation, other switch members (not shown) will then be closed so as to apply current through the transformer to the electrode, pressure upon the electrode being supplied by the hydraulic means controlled by the member 37 in a well known way. The switch members are usually controlled by time-operated devices in a control box (not shown). The body 12 of the magnet acts as a second electrode, the circuit being to the electrode 2 through the metallic work and through the magnet 12 to the cable 35 to the secondary of the transformer. If desired manual operation of the switch members can be used in the same sequence.

By this arrangement it will be seen that a welding machine is provided, the electrode of which can be readily removed from one position of welding operation to another and being securely held in each of those positions by an electromagnet which is positioned directly upon the work to be welded, the magnet acting as the other electrode.

In Figs. 4, 5 and 6 there is shown a modification in which those parts which are common to Figs. 3, 4 and 5 are given the same reference characters with the addition of a prime exponent. In this modified view the electrode 2' and its holder 1' are not only carried by the electro-magnet but the transformer for the welding current is also carried thereby.

The core 42 of the transformer is attached to the body of the electro-magnet by a pair of angle plates 43, the vertical legs of which are fastened to the core of the transformer by the bolts 45 and the horizontal legs of which are secured to the body of the electromagnet by cap screws 46 with interposed washers of insulating material 47 and 48. The upper end of the core 44 of the transformer is secured to an arm 49 by angle plates 50, the horizontal legs of which are fastened to the transformer core by the bolts 51 and the horizontal legs of which are secured to the arm by the cap screws 52. Attached to the arm 49 is the holder 1' for the electrode 2', the holder having a threaded extension 53 extending through the arm and with nuts 54 thereon whereby it may be clamped to the arm. Any suitable means (not shown) may be employed to apply fluid pressure to the electrode, a flexible connection like the one shown at 26 in Fig. 1 being applied at any suitable point in the holder 1'.

Having thus described my invention, I claim:

1. In an apparatus of the character described, a single welding machine electrode, an electric welding circuit for said electrode comprising a transformer, and a support for said electrode and transformer comprising an electro-magnet excited by direct current adapted to be applied to the metallic work adjacent the point of the welding operation, said electrode being located entirely at one side of said support and closely adjacent thereto, and all of the parts located on the same side of the work.

2. In an apparatus of the character described, a single welding machine electrode, an electric circuit for said electrode comprising a transformer, and a support for said electrode comprising an electro-magnet excited by direct current adapted to be applied to the metallic work adjacent the point of the welding operation, the body of said electro-magnet acting as a second electrode and being in series with said first electrode in said electric circuit, said electrode being located entirely at one side of said support and closely adjacent thereto, and all of the parts located on the same side of the work.

3. In an apparatus of the character described, a single welding machine electrode, an electric welding circuit for said electrode comprising a transformer, a support for said electrode comprising an electro-magnet excited by direct current adapted to be applied to the metallic work adjacent the point of the welding operation, the metallic body of said magnet having an electrical connection with the secondary of said transformer so as to act as a second electrode, said electrode being located entirely at one side of said support and closely adjacent thereto, and all of the parts located on the same side of the work.

CLARENCE RINGWALD.